April 21, 1942.  J. S. PAGE  2,280,769
CASING CUTTER
Filed Feb. 12, 1940
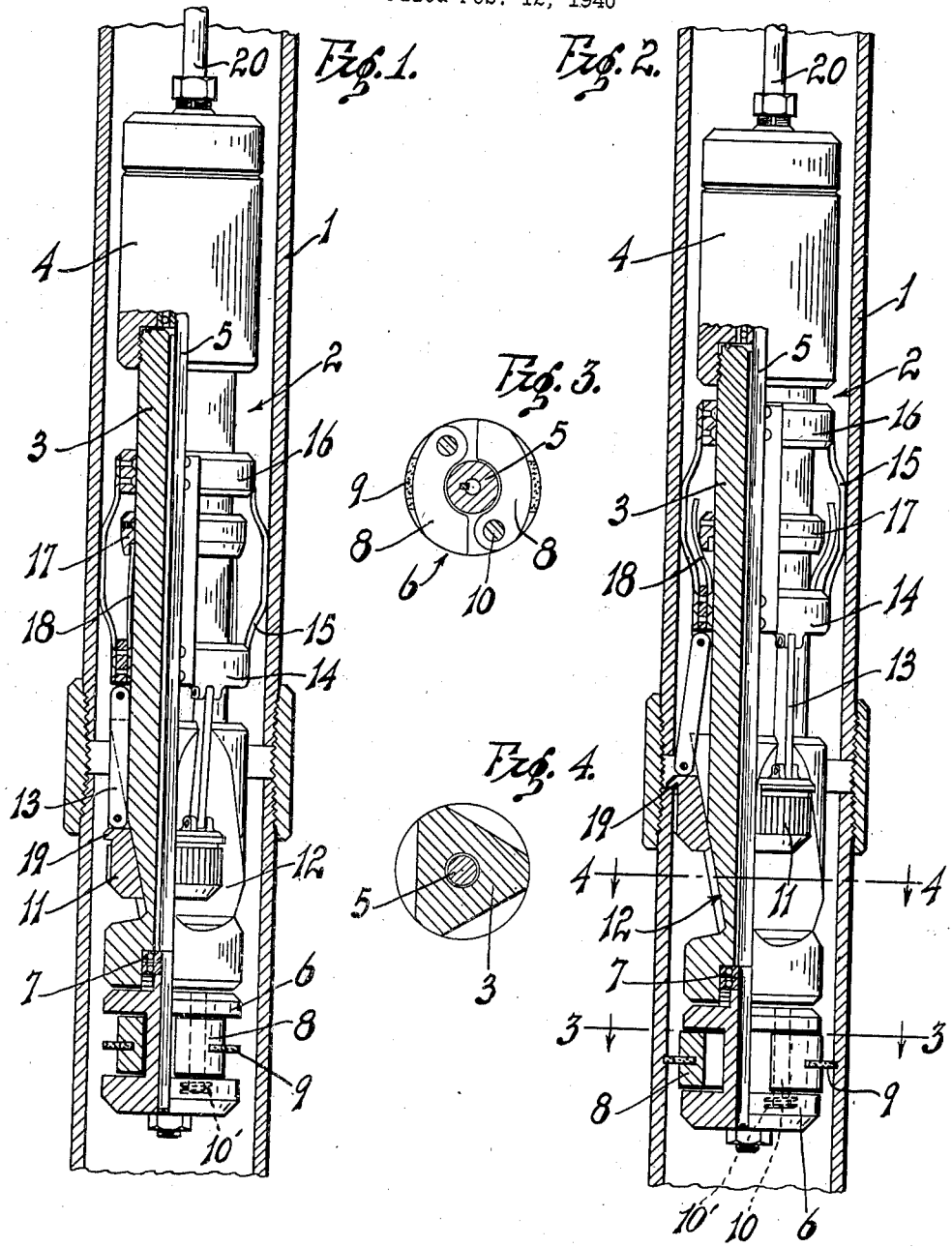
INVENTOR.
JOHN S. PAGE.
BY
H. A. Duckman
ATTORNEY.

Patented Apr. 21, 1942

2,280,769

UNITED STATES PATENT OFFICE 2,280,769

CASING CUTTER

John S. Page, Long Beach, Calif.

Application February 12, 1940, Serial No. 318,515

3 Claims. (Cl. 51—184.1)

This invention relates to a casing cutter of the inside type and particularly a cutter having a self-contained driving element such as an electric motor.

An object of my invention is to provide a novel casing cutter of the inside type, which can be quickly and easily set in position within the casing, which is to be cut, and thereafter, upon starting the electric motor, the casing will be severed, at the desired point.

Another object is to provide a novel means of mounting the cutters so that rotation of the motor will automatically move the cutters out into engagement with the casing.

Still another object is to provide a novel cutter mount so arranged that upon rotation of the motor the cutters will be pressed against the casing with the proper pressure, and will continue to press and cut the casing until it has been severed.

Other objects, advantages and features of invention may appear from the accompanying drawing, the subjoined detailed description, and the appended claims.

In the drawing:

Figure 1 is a side elevation of my casing cutter, one-quarter of which has been broken away to show interior construction, the cutter being in the position of entering the casing.

Figure 2 is a view similar to Figure 1 with the parts arranged as when the cutter is fixed in position, and with the cutter head engaging the casing.

Figure 3 is a sectional view taken on line 3—3 of Figure 2.

Figure 4 is a sectional view taken on line 4—4 of Figure 2.

Referring more particularly to the drawing, the numeral 1 indicates the casing or pipe which is in position in the bore of the well and which it is desired to cut in order that sections thereof may be removed. My casing cutter 2 includes a sleeve 3. A motor 4, preferably electrical, is mounted on the upper end of the sleeve 3—that is, the housing of this motor is fixedly attached to the sleeve. The armature shaft 5 of the motor 4 extends downwardly through the sleeve 3. A cutter head 6 is secured to the lower end of the armature shaft 5, and is suitably journaled in the lower end of the sleeve 3 by means of annular ball bearings 7, or the like.

A pair of arms 8—8 are eccentrically mounted in the head 6, as shown in Figure 3. An abrasive cutter 9 is attached to each of the arms (such as an emery stone), and this abrasive cutter is thrown outwardly against the casing 1 when the head 6 is rapidly rotated by the motor 4—that is, the centrifugal force will throw the arms 8 outwardly about their eccentric pivots 10, thus pressing the abrasive cutters 9 against the casing, and causing the casing to be severed. The electric motor 4 will revolve at high speeds and the abrasive cutters 9 are quite effective cutters when operated at high speed. The arms 8 are retracted when the motor stops by means of suitable springs 10' which engage the pins 10.

My casing cutter must be held against longitudinal movement while the casing is being cut, and for this purpose I provide a plurality of slips 11, each of which are mounted on a flat outwardly tapered surface 12, formed on the outside of the sleeve 3. The slips 11 are pulled upwardly and outwardly on the tapered surfaces 12 by the following arrangement:

A link 13 is pivotally secured to each of the slips and to a lower collar 14. A plurality of spring arms 15 are attached to the collar 14, and to an upper collar 16. These spring arms frictionally engage the inside of the casing 1, as shown in Figures 1 and 2, and, therefore, will hold the slips 11 and collars 14 and 16 stationary, relative to the balance of the cutter when the cutter is pulled upwardly by the workman at the surface. A latch ring 17 is fixedly secured to the sleeve 3, and a plurality of spring fingers 18 extend upwardly from the collar 14 and enter a suitable annular recess in the bottom of the latch ring 17. Upward movement of the sleeve 3 will, therefore, release the spring fingers 18 from the latch ring 17, permitting these springs to spring outwardly, as shown in Figure 2. Thereafter, the sleeve 3 can be lowered relative to the collars 14 and 16, and this causes the slips 11 to be pushed upwardly and outwardly to engage the casing. The slips 11 may be provided with a lip 19 at the upper end, and this lip drops into the collar recess, as shown in Figure 2. This is a further insurance that the casing cutter will not move downwardly once the motor 4 is started.

After the casing cutter is set, as described, the motor 4 is started from the surface, the cutter head 6 will revolve, and the abrasive cutters will sever the pipe. The cable 20, which supports the cutter, also acts as the conduit through which the electricity is fed to the motor. The wickers on the slips 11 may be arranged vertically, and thus when these slips engage the casing, the sleeve 3 and the motor housing are effectively held against rotation.

Having described my invention, I claim:

1. A casing cutter comprising a sleeve, an electric motor mounted at the upper end of the sleeve, an armature shaft depending from the electric motor and extending through the sleeve, a cutter head journaled in the lower end of the sleeve, two or more cutter arms eccentrically pivoted on the cutter head, cutters on each of the cutter arms adapted and arranged to engage the casing as the cutter arms are swung outwardly by centrifugal force, and casing engaging means on the sleeve arranged between the motor and the cutter head, said casing engaging means comprising a plurality of slips slidably mounted on the sleeve, spring arms slidably mounted on the sleeve, and means connecting the spring arms and the slips whereby the slips are moved outwardly into engagement with the casing on downward movement of the sleeve relative to the slips.

2. A casing cutter comprising a sleeve, an electric motor mounted at the upper end of the sleeve, an armature shaft depending from the electric motor and extending through the sleeve, a cutter head journaled in the lower end of the sleeve, two or more cutter arms eccentrically pivoted on the cutter head, cutters on each of the cutter arms adapted and arranged to engage the casing as the cutter arms are swung outwardly by centrifugal force, and casing engaging means on the sleeve arranged between the motor and the cutter head, said casing engaging means comprising a plurality of slips slidably mounted on the sleeve, spring arms slidably mounted on the sleeve, and means connecting the spring arms and the slips whereby the slips are moved outwardly into engagement with the casing on downward movement of the sleeve relative to the slips, a latch ring on the sleeve, a spring finger mounted adjacent the spring arms and slidable therewith, said spring finger releasably engaging the latch ring.

3. A casing cutter comprising a sleeve, an electric motor mounted at the upper end of the sleeve, an armature shaft depending from the motor and extending through the sleeve, a cutter head mounted on the lower end of the shaft and journaled in the sleeve, two or more cutter arms pivotally mounted on the cutter head and movable outwardly under centrifugal force, a cutter on each of the cutter arms adapted and arranged to engage the casing as the cutter arms are swung outwardly by centrifugal force, and casing engaging means on the sleeve arranged between the motor and the cutter head, said casing engaging means comprising slips engageable with the casing on movement of the sleeve relative to the casing, friction means engaging the casing and means connecting the friction means and the slips.

JOHN S. PAGE.